3,392,076
PROCESS FOR EXTRUSION COATING OF PLASTIC
FILM ON A RUNNING CARRIER WEB
Ernst W. van Gilse van der Pals, Kavlingevagen 25,
Lund, Sweden
Filed June 29, 1964, Ser. No. 378,986
Claims priority, application Sweden, July 1, 1963,
7,255/63
1 Claim. (Cl. 156—244)

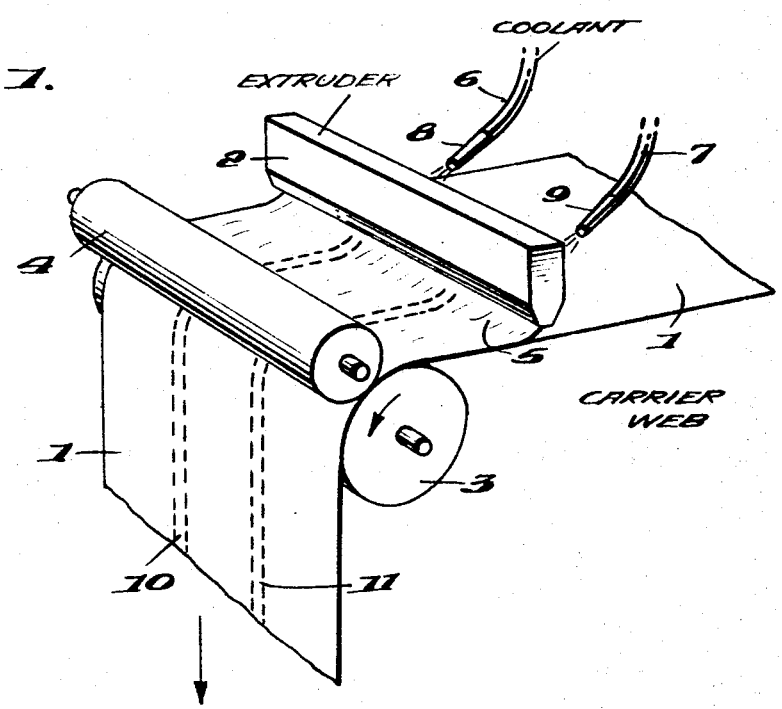
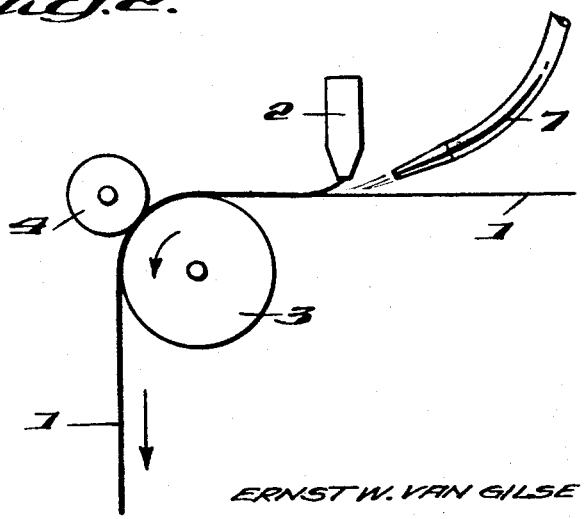

The present invention relates to a process for extrusion coating of plastic film on a running carrier web of the kind where the molten plastic film from the extrusion nozzle meets the carrier web immediately before being led together therewith through a roller nip in order to be caused in the said nip to adhere to the carrier web by pressure.

As a rule, the roller nip is defined on one hand by a rubber roller engaging the carrier web and on the other by a steel roller engaging the plastic film and being mostly cooled.

As the final adhesion between the plastic film and the carrier web of the laminate is dependent on the pressure by means of which the molten plastic film is pressed in the roller nip against the carrier web, the adhesion may be reduced or eliminated by varying the said pressure. If it is desired to change the adhesion in this respect in a longitudinal zone, the roller nip pressure must consequently be changed to a corresponding degree along that portion of the roller nip which corresponds to the zone width. In reality this implies that at least one roller in the roller nip must be provided with a corresponding annular track or groove.

By means of a coating equipment modified in this way laminates may of course be produced, having an adhesion between the plastic film and the carrier web which is impaired or completely eliminated along a longitudinal zone. If several zones of this kind are desired in the final laminate, or if it is desired to displace the zone in the width sense, complicated changes have to be made in the equipment. To be able to realize in the zone or zones an adhesion varying in the longitudinal direction of the laminate is completely impossible.

The method according to the invention has for its object to eliminate these drawbacks and limitations, and is essentially characterized in that the molten plastic film is cooled zonewise along that side which is to face the carrier web, using a gaseous coolant in order that the laminate may obtain less adhesion between the plastic film and the carrier web in at least one zone than in the vicinity of the zone.

Due to this local cooling of the molten plastic film its adhesion characteristics are changed along the corresponding zone or zones. Without changing the contact pressure of the rollers in the corresponding zone or zones the laminate will thus obtain less adhesion between the plastic film and the carrier web in the said zone or zones. This fact is of very great importance, for it means that neither roller has to be provided for the same purpose with one or more corresponding annular rollers or tracks.

As the local cooling takes place by means of a gaseous coolant, which can be supplied to the plastic film side by means of simple nozzles, the displacement of the cooling zone or zones along the roller nip is also facilitated. It is even possible to let the coolant nozzle or nozzles describe, during the coating, a motion in the width sense of the carrier web, whereby the zones of the laminate which have less adhesion do not have to be parallel to the longitudinal sense of the laminate.

Another possibility provided by the process according to the invention is that the degree of adhesion in each of the said zones can be varied in a simple manner in the longitudinal direction of the laminate merely by varying the supply of coolant to the respective coolant nozzle. Of course, this variation may have an intermittent character, whereby the zone which has a lower adhesion may present interruptions in the longitudinal sense of the laminate.

Since the molten plastic film will as a rule meet the carrier web only immediately before the roller nip, it seems natural to bring about the zone cooling of the plastic film by means of one or more nozzles directing the respective jet of cooling gas between the plastic film and the carrier web in the feed direction of the web and against the point where the plastic film and the carrier web meet in a point. This will in all probability entail that in the respective zone a gaseous zone a gaseous layer which is at least molecular will be trapped between the plastic film and the carrier web when the latter passes through the roller nip. This circumstance also contributes to counteracting the adhesion in the zone in question.

The method to the invention has been applied with success to extrusion coating of polyethylene on a paper web.

The process of the invention is illustrated in the accompanying drawing, in which FIG. 1 is a perspective view, in simplified form, of apparatus for carrying out the present process; and FIG. 2 is a side elevational view showing the spatial relationship among the carrier web, the freshly extruded film and the jets of gaseous coolant.

In the drawing, a carrier web 1 is represented as being passed in horizontal plane beneath an extruder 2 and thence through a nip between cooperating pressure rollers 3 and 4. Extruder 2 delivers a sheet of plastic film 5 to carrier web 1, which plastic film thereupon is pressed onto the carrier web in passage between pressure rollers 3 and 4. Spaced nozzles 6 and 7 deliver jets 8 and 9 of gaseous coolant into the juncture between film 5 and web 1. By reason of the coolant layer, spaced "ribbon" areas 10 and 11 of film 5 have relatively poor adhesion to carrier web 1.

I claim:
1. A process for extrusion coating of plastic film on a running carrier web of the kind where the molten plastic film from the nozzle meets the carrier web immediately before being led together therewith through a roller nip in order to be caused to adhere to the carrier web in the said nip by pressure, characterized in that the molten plastic film is cooled zonewise along that side which is to face the carrier web, using gaseous coolant, in order that the laminate may obtain lower adhesion between the plastic film and the carrier web in at least one zone than in the vicinity of the said zone, the gaseous coolant being supplied between the molten plastic film and the carrier web in the feed direction of the web and against the place where the plastic film and the carrier web meet in a point, in order that between the plastic and the carrier web at the passage through the roller nip a gaseous layer counteracting the adhesion may be trapped in the said zone or zones.

References Cited
UNITED STATES PATENTS 3,070,481  12/1962  Schornstheimer ____ 156—290 X
3,075,868   1/1963  Long _____ 156—244 X
3,130,647   4/1964  Anderson et al. ____ 156—244 X
3,218,212  11/1965  Underwood _____ 156—244

FOREIGN PATENTS
573,342  3/1959  Canada.

EARL M. BERGERT, Primary Examiner.
T. R. SAVOIE, Assistant Examiner.